United States Patent [19]

Ames et al.

[11] 4,002,562
[45] Jan. 11, 1977

[54] OIL EMULSION PROCESSING

[75] Inventors: Robert K. Ames, Seattle; Hans H. Peters, Federal Way, both of Wash.

[73] Assignee: Resources Conservation Co., Renton, Wash.

[22] Filed: Sept. 18, 1975

[21] Appl. No.: 614,511

[52] U.S. Cl. .............................. 210/22 R; 210/43; 252/344
[51] Int. Cl.$^2$ ........................................ B01D 17/04
[58] Field of Search ...................... 210/21, 22, 43; 252/329, 330, 344, 348, 358; 260/412.5

[56] References Cited

UNITED STATES PATENTS

| | | | |
|---|---|---|---|
| 2,407,895 | 9/1946 | Monson et al. | 252/344 |
| 2,762,681 | 9/1956 | Crowley | 210/43 X |
| 2,903,424 | 9/1959 | Fong | 210/43 |
| 3,148,154 | 9/1964 | DeGroote et al. | 252/344 |
| 3,637,521 | 1/1972 | Tsuk | 252/344 X |
| 3,644,214 | 2/1972 | Akell | 210/21 X |
| 3,899,419 | 8/1975 | Emanuel | 210/22 |
| 3,900,423 | 8/1975 | Markofsky | 252/344 |

*Primary Examiner*—Frank A. Spear, Jr.
*Assistant Examiner*—Robert H. Spitzer
*Attorney, Agent, or Firm*—Bacon & Thomas

[57] ABSTRACT

A method for processing an oil-water emulsion to remove oily material therefrom comprising forming a mixture of the oil-water emulsion with liquid amine, in which oils of the emulsion are soluble and having an inverse critical solution point with water, at a temperature below the phase separation temperature of the amine and water so as to form a single liquid phase of amine, oil and water, separating said single liquid phase from any solids which may be contained in the emulsion, raising the temperature of the resulting single liquid phase above the critical solution temperature to effect liquid phase separation whereby an amine phase containing substantially all of the oily material of the emulsion and a water phase containing substantially no oily material are formed, and then separating the two liquid phases. The amine phase is readily processed to recover oily matter therefrom and may be recycled for the processing of additional oil emulsion. The filtration of solids from the single phase mixture is improved by addition of lime and/or filter aids. The method is applicable to a wide range of oil-water emulsions, including oil-in-water and water-in-oil emulsions, and finds particular utility in the processing of waste emulsions which have been difficult to process with known methods. Representative of these are the wool grease-in water emulsions resulting from wool scouring processes.

11 Claims, 2 Drawing Figures

OIL EMULSION PROCESSING

CO-PENDING APPLICATIONS

This application is related to co-pending applications Ser. No. 385,488, filed Aug. 3, 1973 to Hans Peters and Ser. No. 385,489, filed Aug. 3, 1973 of Robert K. Ames, now U.S. Pat. No. 3,926,201 issued Dec. 9, 1975.

BACKGROUND OF THE INVENTION

The present invention relates to the separation of oily and solid matter from oil-water emulsions. Oil-water emulsions are defined as emulsions containing water and oily materials including oils, greases, fats, fatty materials and the like from animal, vegetable or petroleum sources. Oil-in-water and water-in-oil emulsions are included.

Many industrial and agricultural processes produce oil-water emulsions containing various waste materials such as oils, greases, fats, insoluble organic and inorganic solids and water soluble salts. In many instances, these materials, which may be of substantial value, remain unused due to the fact that they are either unrecoverable or that it is economically unfeasible to do so. Exemplary of some of these oil-water emulsions are water-oil emulsions which occur as undesirable by-products of petroleum refining and waste emulsions containing animal or vegetable fats, grease, oils and/or other related oily substances, such as packing plant waste emulsions, fish processing waste emulsions, steel mill waste emulsions and wool scouring emulsions.

The cost of treatment of oil emulsions by known processes, such as those processes which rely on acid or base treatment or solvent extraction, is quite high and in general has not proved economically attractive. However, the discarding of valuable and useable materials often found in these oil emulsions is an unfortunate waste, and in most cases, the disposal of the emulsions to sewage systems and/or streams and rivers is environmentally unacceptable without treatment of some sort, e.g., by subjecting them to biodegradation for prolonged periods in storage lagoons.

A particular example of this type of situation is the disposal problem encountered with oil emulsions resulting from the wool scouring process. As pointed out in United States Patent to Joseph Del Pico, U.S. Pat. No. 3,848,804, incorporated by reference herein, wool scouring emulsion contains a substantial amount of wool grease as well as other impurities, such as suint, dung, earth, sand, etc.. The wool scouring emulsion is typically formed by washing of the wool in either a cold water bath to remove water soluble impurities or a hot water surfactant-containing bath which emulsifies and removes the wool grease. This wool scouring emulsion will usually contain from 1 to 8% wool grease which is composed mainly of lanolin. A centrifugal recovery process which has been used prior to the present process is said to provide for recovery of only up to about 50% by weight of the wool grease of the emulsion and typically 25 to 40%.

Another method of wool grease recovery from wool scouring emulsions is known as the acid cracking process, where the pH is adjusted to between about 2 and 4 to provide for destabilization of the wool grease emulsion, followed by subsequent collection of the wool grease as a sludge material. A typical recovery yield of wool grease using this process is about 65% by weight, however, in most cases this treatment deleteriously affects the mixture of alcohol, acid and ester compounds of which lanolin is composed and thus has the inherent disadvantage of recovering a low quality lanolin.

In some instances, wool scouring emulsion is processed by a combination of the above described leading methods as well as other treatments such as, for example, hexane extraction, however, it has been found that while increasing the yield of wool grease, combinations of these processes become increasingly more expensive.

There are many other instances in which oil-water emulsions contain an economically valuable material, which is undesirable to dispose of by dumping into the sewage systems, and economically unfeasible to remove by prior art means.

A method for dewatering sludges by use of an amine or mixture of amines having an inverse critical solution point is described and claimed in Emanual Pat. No. 3,899,419 issued Aug. 12, 1975 and assigned to the assignee hereof, and expressly incorporated herein by reference. Improvements in such process are disclosed in the aforementioned, commonly assigned, co-pending applications of Ames, U.S. Pat. No. 385,489, and Peters, U.S. Pat. No. 385,488.

It has now been found that the amines of these processes provide a novel and economical method of processing a variety of oil-water emulsions, which may or may not contain insoluble solids but which contain oily or otherwise hydrophobic material having substantial solubility in the amine or amine mixture.

It is therefore an object of the present invention to provide a method of processing oil-water emulsions whereby oily or other hydrophobic materials may be removed therefrom and otherwise separated from salts and other hydrophilic materials.

It is a further object of the present invention to provide a method for processing an oil-water emulsion which is simple and economical, and provides for substantially complete removal of such oily materials from oil-water emulsions.

It is an additional object of the present invention to provide a method of processing an oil-water emulsion whereby economically valuable materials may be removed from such oil emulsions without degrading their quality, and in a yield greater than has been economically feasible in the prior art.

It is a further object of the present invention to efficiently separate solid matter from oil emulsions.

It is furthermore a particular object of the present invention to provide a method for the processing of a wool scouring emulsion to economically recover valuable by-products therefrom such as, for example, lanolin, and to provide for the environmentally safe disposal of unwanted by-products.

SUMMARY OF THE INVENTION

The present invention provides a method for the processing of oil-water emulsions containing water and oily or hydrophobic materials and in some instances water soluble and/or water insoluble solids. The oil-water emulsion is mixed with an amine or amine mixture in which the oily material of the emulsion is soluble and exhibits an inverse critical solution point in a two phase system with water, under conditions whereby the mixture forms a single continuous liquid phase containing amine, water and oil. The resulting mixture may be filtered while in a single continuous phase at a temperature below the critical solution temperature to remove amine and water insoluble solid matter therefrom. The temperature of the resulting liquid is then raised above the critical solution temperature to effect phase separation into a phase containing the oily material in solution and a water phase containing any water soluble components. The two phases may be then mechanically separated. The aqueous phase is further processed or disposed of as desired, while the amine phase is treated to remove the oily material, and the resulting amine recycled to be utilized in the processing of additional oil emulsion.

While not limited thereto, the method of the present invention is particularly useful in the processing of wool scouring emulsion, for the economical removal of wool grease therefrom.

The preferred liquid amine for use in the present invention comprises secondary or tertiary amines or mixture thereof, which exhibit the above-described inverse critical solution temperature. The most preferred amines are those which exhibit an inverse critical solution point at or near atmospheric pressure and prevailing ambient temperatures. Below the inverse critical solution point the water and the amine are completely miscible in all proportions. Above the inverse critical solution point these amines and water will separate into two distinct phases, one phase being primarily amine with a small amount of water in solution therewith and the other phase being primarily water with a small amount of amine dissolved therein.

More particularly, the preferred amines comprise a member or mixture of members from the group of amines having the formula:

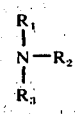

wherein, $R_1$ can be hydrogen or alkyl, $R_2$ and $R_3$ can independently by alkyl radicals having from 1 to 6 atoms or alkenyl radicals having 2 to 6 carbon atoms, the total number of carbon atoms in the amine molecule being in the range of from 3 to 7, inclusive, and wherein the amine exhibits an inverse critical solution temperature in a two phase system with water. Exemplary of these amines are triethylamine and diisopropylamine, with the most preferred being triethylamine. Triethylamine is the most preferred of the foregoing class of amines because of its low cost and its lack of polar solvent attraction. A two phase system of this amine with water is characterized by an inverse critical solution temperature, at a pressure of 760 millimeters of mercury, of approximately 18.7° C. (approximately 66° F.).

It is to be understood that the inverse critical solution temperature of any given mixture of amine and water may be slightly affected by the presence of water soluble salts, oily components soluble in the amine, and insoluble particulate or solid matter. For any given system within the pervue of this invention, however, there is a predeterminable temperature below which the water and the amine will become completely miscible.

The oil-water emulsion, particularly in the case of wool scouring emulsions and other oily emulsions containing insoluble solids, is preferably treated prior to mixture with the amine with a filtering aid such as, for example, Dicalite, to aid in the removal of solid matter.

Additionally, the oil-water emulsions from the wool scouring process are preferably pretreated with lime, prior to mixture with the amine, in order to improve filtration.

The present invention can be better understood in light of the following description of the preferred embodiments in conjunction with the accompanying drawings wherein:

DESCRIPTION OF THE PREFERRED EMBODIMENTS

As has been pointed out above, the method of the present invention finds utility in the processing of a broad range of oil-water emulsions resulting, for example, from industrial and agricultural processes, and in particular, the present invention has been found to be valuable in the processing of wool scouring emulsion which is a by-product of wool production. While the preferred embodiment will be described with reference to this particular material, it should be made clear that the use of the present method with wool scouring emulsion is solely exemplary, and representative of the general utility of the present invention in breaking emulsions.

Figure 2:
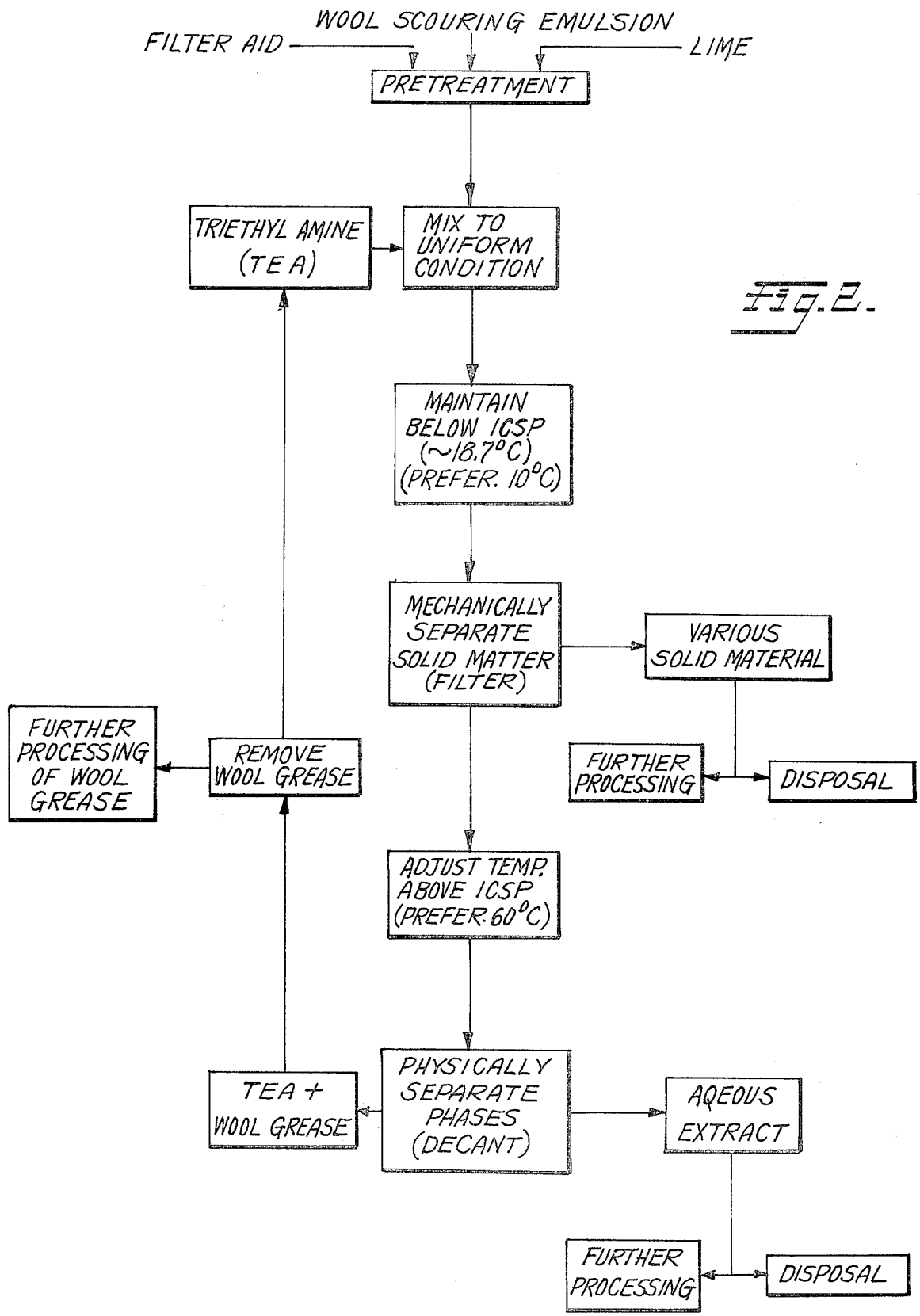
FIG. 2 is a flow diagram showing a preferred embodiment of the present invention, in the processing of wool scouring emulsion.

Referring now to FIG. 2, a preferred process will be described in conjunction with the flow sheet. The wool scouring emulsion is first subjected to a pretreatment with a filtering aid such as, for example, Dicalite (diatomaceous silica) and with an alkaline composition such as, for example, lime (calcium hydroxide). It should be understood that this pre-treatment is not absolutely essential to the invention but does provide for a much more efficient removal of solid matter from the subsequent single phase mixture obtained upon addition of amine to wool scouring emulsion. The amount of lime added may be in the range of about 0.1% to 1.0% or more by weight, based on weight % of $Ca(OH)_2$ to weight of the emulsion. Greater amounts of lime can be used but to no advantage. Surprisingly, lime or calcium hydroxide is much better for this purpose than other alkalies. However, other filter aids may be substituted for the Dicalite. Such diatomaceous filtering aids are well known in the art and need no further description here.

Subsequent to the pretreatment discussed above, the wool scouring emulsion being processed is mixed with an amount of triethylamine which is sufficient for substantially all of the oil in the emulsion to be completely miscible in the amine at a temperature below the inverse critical solution point. In the case of triethylamine at a pressure of 760 millimeters of mercury, this is a temperature of approximately 18.7° C., or 66° F..

It is to be understood that the inverse critical solution temperature may be slightly effected by the material present in the wool emulsion being processed, such as the materials soluble in the amine or in the water, as well as insoluble particulate solid matter present. The single phase or first temperature range of the present method comprises those temperatures where the water and amine will become completely miscible. It is preferred that the temperature be maintained less than about 3° F. below the critical solution temperature during mixing of the amine and emulsion and during the separation of solids from the single phase liquid mixture. Good results are obtained by maintaining the mixture between about 40°–60° F. but lower temperatures may be used if desired, the optimum being readily determined by those skilled in the art. The emulsion and/or amine may be precooled prior to mixing to ensure that the temperature will stay below the inverse critical solution temperature and to overcome the effects of heat of solution, e.g., the emulsion may be pre-cooled to about 20° to 25° F. below the inverse critical solution temperature.

While a typical amount of the amine to be used is approximately 4 times by weight the amount of oil emulsion, from about one to seven times the amount of oil emulsion has been found to be quite useful. It is to be stressed, however, that the method of the present invention encompasses the addition of any amount of the amine such that substantially complete miscibility with the emulsion occurs below the inverse critical solution temperature.

While it is preferred that the temperature of the oil-water emulsion, as well as that of the amine, be below the critical solution temperature at the time of mixing, the two may be mixed at any desired temperature and the temperature of the mixture then adjusted to within the temperature range below the inverse critical solution temperature.

After the formation of the single continuous phase of amine, oil and water, the mixture may be filtered, or solid matter separated by other suitable means while maintaining the temperature below the inverse critical solution temperature. Typically, vacuum filtration is desirable, however, other methods well known in the art of solid matter separation will suffice. It is to be noted that while generally desirable, the separation of solid matter is not absolutely essential to the method of the present invention. Breaking of the emulsion and separation of oily matter by the amine can occur with or without filtration of any solid matter present.

After filtration of solids is accomplished, the temperature of the resulting single phase liquid mixture is raised into a second temperature range, which encompasses those temperatures at or above the inverse critical solution temperature of the particular amine being used. Again, this temperature will be effected by conditions of the extraction, and so will be defined as that temperature at which substantially complete separation into distinct phases occurs. In a preferred embodiment, utlizing triethylamine (TEA) to process wool scouring emulsion, the temperature of the mixture should be raised to at least 66° F. and preferably to about 100°–160° F.. Upon separation of the mixture into an amine-oily material phase, and a water-hydrophilic material phase, the two phases may then be separated by decantation, or other suitable means. With a separation temperature of about 60° C., and utilizing a calcium hydroxide pretreatment, the residual amine remaining in the water phase after steam stripping will attain a value on the order of about 0.004% by weight.

It has been found that where substantially all of the amine is separated from the aqueous phase of the mixture, oily material which has substantial solubility in the amine and almost no solubility in the water is also substantially completely removed from the aqueous phase of the mixture. This has been found to be the case with wool grease in the processing of wool scouring emulsion. In this instance the separated amine phase contains most of the lanolin and other oily substances which were present in the original emulsion.

The step of separation of the amine phase from the aqueous water phase, may be done by any of the separatory methods conventional in the art. On a small scale it has been accomplished by decanting or through the use of a separatory funnel.

Subsequent to separation of the two liquid phases, either phase may be processed further as desired. The aqueous phase may be processed by well known chemical methods to remove various salts or other materials which may be dissolved therein, or alternatively may be directly disposed of as sewage, with no difficulty in bio-degradation in view of the removal of substantially all hydrophobic substances.

The triehtylamine (TEA) phase, is easily processed by known methods to remove the oily materials extracted from the oil-water emulsion, and is recycled for admixture with additional emulsion. This may be done by, for example, low temperature distillation of the triethylamine leaving most of the concentrated oily hydrophobic materials behind for further purification in a conventional manner. The distilled triethylamine is then recycled for treatment of further emulsion. The triethylamine may alternatively be recycled several times without removal of oily materials so as to form a greater concentration thereof and promote greater efficiency of the eventual separation of the triethylamine and oily material.

Figure 1:
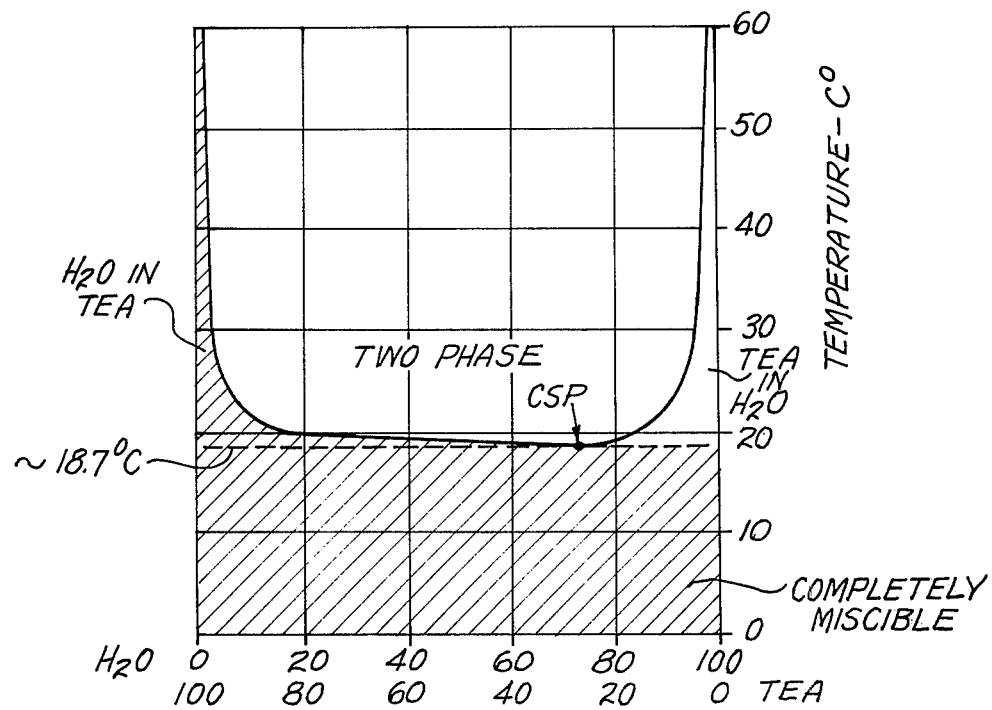
FIG. 1 is a phase diagram of two phase system of triethylamine and water, showing in the shaded portion the conditions under which a single phase liquid system may be formed.

The invention will be further understood by reference to FIG. 1 which is a phase diagram for a two phase liquid system of triethylamine and water. The inverse critical solution point (CSP) is at a concentration of approximately 25% triethylamine to 75% water and at a temperature of approximately 18.7° C.. Below the curve, in the shaded area, the triethylamine and water are substantially completely miscible. The present process may be operated with amine-water proportions and with temperatures in the shaded area below the curve between concentrations of about 20:80 parts by weight of amine to water and 90:10 parts by weight of amine to water with a concentration in the range of 1 to 7 parts of amine to 1 part of water being most preferred. Admixture of the amine with the emulsion under such conditions will cause the emulsion to break and a single liquid phase to be formed. While the inverse critical solution temperature may be effected slightly by materials of the mixture, for any given triethylamine, oil-water emulsion system encompassed by the method of the present invention, there is a predetermined temperature range within which the mixture will be completely miscible.

EXAMPLES

Specific examples of the method of the invention utilized in the processing of wool scouring emulsion and in the processing of a steel mill emulsion will now be presented. It should be understood that these examples are not intended to limit the present invention in any way but only to provide examples of the best mode presently contemplated.

EXAMPLES 1–5

Five 100 milliliters samples of wool scouring emulsion, from a hot water scouring process and containing wool grease and the usual soluble and insoluble impurities of the wool were processed. Four of these were subjected to various pretreatments by mixing with alkaline material and/or filter aid as shown under Samples 1, 2, 4 and 5 in Table 1 below. Sample No. 3 was not pretreated. Subsequent to pretreatment, each 100 ml. sample of wool scouring emulsion was chilled to 45° F. while stirring, and 400 ml. of fresh triethylamine was added to each. The emulsion broke during stirring and the liquids formed a single phase. The temperature rose somewhat during admixture, and the mixture was then cooled to 40° F. and filtered in a 4 inch Buchner funnel lined with Whatman No. 1 filter paper. Subsequent to filtration, the results tabulated in Table 1 were obtained.

TABLE I

| Sample | Pretreatment | Comment |
|---|---|---|
| 1 | 5 ml 5% lime | clear filtrate, pasty cake |
| 2 | 2 ml 40% NaOH | no cake-caustic breaks down solids |
| 3 | none | murky filtrate |
| 4 | Dicalite, 0.5 gm | dry cake, murky filtrate |
| 5 | Dicalite, 0.5 gm 5 ml 5% lime | dry cake, clear filtrate |

Example No. 5 using 0.5 grams of Dicalite and 5 ml of 5% lime, was the most desirable, producing a dry cake of filtered material, and a clear filtrate. Example No. 1, which used lime without filter aid also produced a satisfactory clear filtrate but with slower filtration. Examples 3 and 4 were less satisfactory and Example 2, which used caustic solution, is usable only where impurities produced by the solids breakdown can be tolerated.

The triethylamine-oil-water single phase liquid filtrate of Example 5 was raised to a temperature of 60° C. and separation into two distinct phases occurred. Separation of the two phases of Example 5 was made with a separatory funnel, and analysis of the water fraction separated from the filtrate showed no oils present. The amine fraction resulting from this example was subjected to evaporation to drive off the amine, and left a residue of greasy substance comprised mainly of secondary lanolin.

EXAMPLE 6

The conditions from Example 5 were repeated using 2850 ml of wool scouring emulsion pretreated with 150 ml of 5% lime and 15 grams of diatomaceous silica (Dicalite 4200). This mixture was chilled to 45° C. while mixing, and 9 liters of used triethylamine recovered in part from the previous examples, was chilled to 28° F. and added to the wool scouring emulsion while stirring. A mix temperature of 62° F. resulted. The mixture was cooled to 40° F. forming a single continuous phase, and was filtered in a 12 inch Buchner funnel lined with Whatman No. 1 filter paper. The 12 liters of solution filtered in approximately 19 minutes, and a dry filter cake deposited on the filter paper while the filtrate was clear.

After drying in an oven at 115° C. for 24 hours, the filter cake was analyzed for residual amine which was found to be less than 0.0007% by weight.

The temperature of the single phase clear filtrate was raised to 60° C., and separation of the resulting solvent and water phases was accomplished. As in the previous examples, analysis of the water fraction showed no oils, and after separation of the triethylamine by distillation, and evaporation of the residual solvent present, a residue of secondary lanolin was obtained.

EXAMPLE 7

PROCESSING OF A STEEL MILL EMULSION

A quantity of problem emulsion, used during the cold rolling of steel plate for the purposes of cooling and lubricating, was obtained for test from a steel mill. The mill was not able to break this emulsion and recover the oil. The emulsion normally used contains water and mineral oil with animal fat added plus an emulsifying agent. The mill accidentally added two different emulsifying agents resulting in an emulsion that was not amenable to phase separation by the mill's customary method of polymer addition.

Samples of this material, a milky white liquid, were first treated by two standard methods of breaking oil-/water emulsions, namely addition of hexane and trichlorotrifluroethane (Freon). Neither of these solvents when mixed with the emulsion effected a phase separation.

A sample of the emulsion was then processed with triethylamine in accordance with the present invention as follows: [using the standard Basic Extractive Sludge Treatment (B.E.S.T.) procedures as follows (Tests A & B of attached lab data):]

a. A control sample was processed by addition of 400 ml of distilled water to 100 ml of the emulsion. The mixture was filtered thru modacrylic cloth, using a vacuum flask/Buchner funnel, in 5 seconds. The resulting filtrate was milky and essentially the same as the starting mixture.

b. A 100 ml sample of the emulsion was mixed with 400 ml of cold triethylamine (TEA). The temperature of the mixture after initial mixing was 55° F.. The TEA/emulsion mixture was then cooled to 40° F. and filtered, as in (a), in 7 seconds. The filtrate was yellow in color and slightly turbid. After separating the solvent and water phases by heating, each phase was taken to dryness and an oily residue of 0.7564 gms was obtained from the TEA fraction and a residual of 0.2194 gms obtained from the water fraction, i.e., the emulsion was broken and about 78% of the oil and fat recovered from the solvent phase.

Although the present invention has been described in relation to the preferred embodiments thereof, one of ordinary skill in the art will be able to accept various changes and substitutions of equivalence without departing from the scope of the invention as defined by the appended claims.

What is claimed is:

1. A method of breaking oil-water emulsions and recovering the oil component thereof without acidification comprising forming a mixture of the emulsion with a liquid amine having the formula:

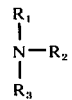

wherein $R_1$ is hydrogen or alkyl, $R_2$ and $R_3$ are alkyl of 1 to 6 carbon atoms or alkenyl of 2 to 6 carbon atoms, the total number of carbon atoms in the molecule being in the range of 3 to 7 inclusive, in which the oil of the emulsion is soluble and which has an inverse critical solution point in a two phase system with water, at a temperature below the phase separation temperature of the amine and water so as to form a single liquid phase of amine, oil and water, the amount of amine being sufficient that substantially complete miscibility with the emulsion occurs below the said inverse critical solution temperature, then raising the temperature of the said single liquid phase above the critical solution temperature to effect liquid phase separation whereby an amine phase containing substantially all of the oily material of the emulsion and a water phase containing substantially no oily material are formed, separating the two liquid phases and separately recovering the oily material and amine from the amine phase.

2. The method of claim 1 further comprising the step of mechanically separating any solid matter in said mixture while it is in a single continuous phase.

3. The method of claim 1 wherein the temperature of the emulsion and amine is maintained below the inverse critical solution temperature during mixing.

4. The method of claim 3 wherein the amine is triethylamine and the temperature is maintained below about 66° F. during formation of the single liquid phase.

5. The method of claim 1 wherein the oil-water emulsion is an emulsion resulting from a wool scouring process.

6. The method of claim 1 wherein the proportions of said composition to said oil emulsion are in the range of from one to seven parts by weight of said composition to one part by weight of oil emulsion.

7. A method for recovering oily material from a wool scouring emulsion without acidification comprising the steps of
forming a mixture of the wool scouring emulsion with liquid amine having the formula:

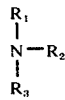

wherein $R_1$ is hydrogen or alkyl, $R_2$ and $R_3$ are alkyl of 1 to 6 carbon atoms or alkenyl of 2 to 6 carbon atoms, the total number of carbon atoms in the molecule being in the range of 3 to 7 inclusive, in which the oily component of the emulsion is soluble and which has an inverse critical solution point with water, at a temperature below the phase separation temperature of the amine and water so as to form a single, liquid phase of amine, oil and water, the amount of amine being sufficient that substantially complete miscibility with the emulsion occurs below said inverse critical solution temperature,
filtering the single phase liquid mixture to remove any solid matter therefrom,
adjusting the temperature of the mixture to above the inverse critical solution temperature whereby amine phase containing substantially all of the oily material of the emulsion and a water phase containing substantially no oily material are formed,
separating the amine phase containing the oily material from the water phase, and recovering the oily material from the amine.

8. The method of claim 7 further comprising:
recycling the amine after removal of the oily material for contacting with additional amounts of wool scouring emulsion.

9. The method of claim 8 wherein the amine is triethylamine and wherein the temperature of the single phase liquid mixture is maintained in the approximate range of 40° to 60° F. prior to and during filtration of the solids.

10. A method for removing wool grease from wool scouring emulsion comprising the steps of:
forming a mixture comprising wool scouring emulsion, a filtering aid, a small quantity of lime and triethylamine in a quantity of about one to seven parts by weight to one part of the emulsion, maintaining the temperature of the mixture below about 66° F. whereby it forms a single liquid phase of amine, wool grease and water, filtering the mixture to remove solid matter therefrom,
adjusting the temperature of the single phase liquid mixture to above about 66° F. whereby a triethylamine phase containing substantially all wool grease and a water phase containing substantially no wool grease are formed,
separating the triethylamine phase and the water phase, and
recovering the wool grease from the amine.

11. The process of claim 10 wherein the amount of lime is about 0.1 to 1.0% based on the weight of Ca(OH)$_2$ to emulsion.

* * * * *